2,911,450

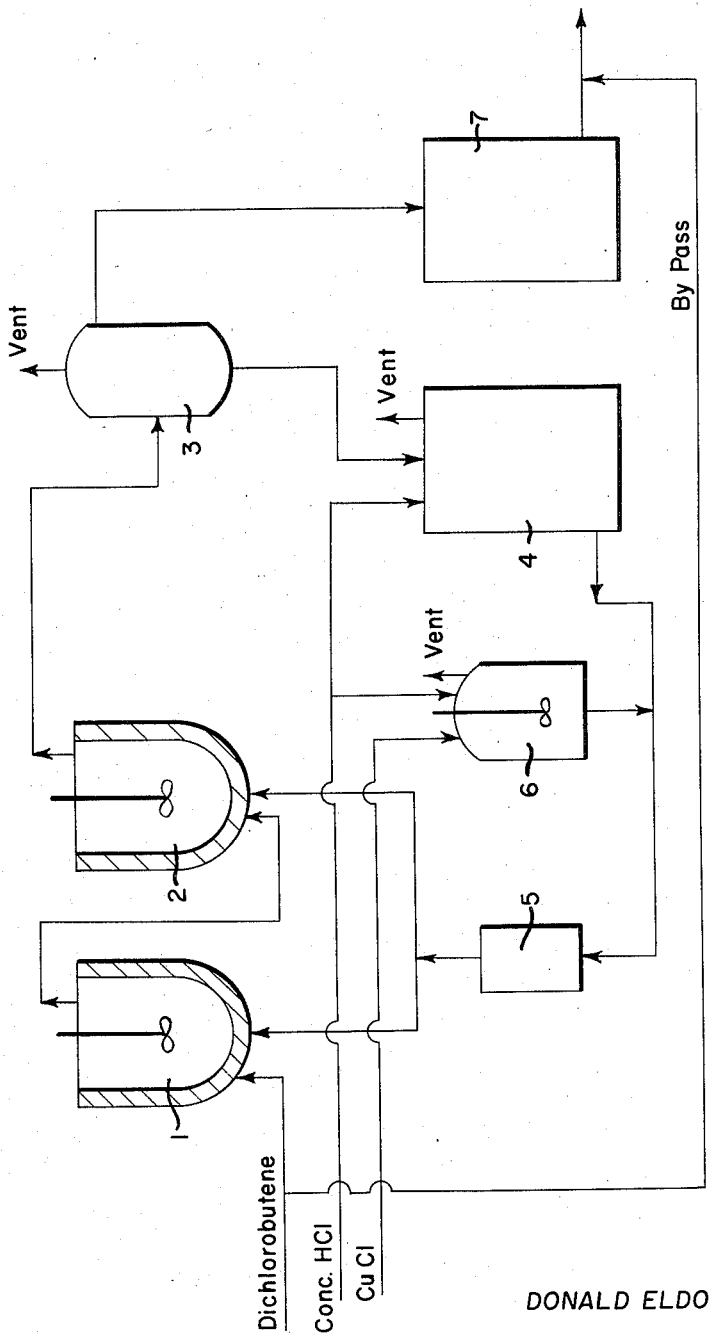
Nov. 3, 1959 — D. E. WELTON — 2,911,450
ISOMERIZATION OF DICHLOROBUTENES
Filed Dec. 13, 1957
INVENTOR
DONALD ELDON WELTON
BY *a. McAlevy*
ATTORNEY United States Patent Office 2,911,450
Patented Nov. 3, 1959

ISOMERIZATION OF DICHLOROBUTENES

Donald Eldon Welton, Victoria, Tex., assignor to E. I. du Pont de Nemours and Company, Wilmington, Del., a corporation of Delaware Application December 13, 1957, Serial No. 702,615

4 Claims. (Cl. 260—654)

This invention relates to a process for isomerizing 3,4-dichlorobutene-1 and cis-1,4-dichlorobutene-2 to trans-1,4-dichlorobutene-2.

The production of 1,4-dicyanobutene-2 (an adiponitrile intermediate) by nitrilation of mixtures of isomeric dichlorobutenes has been reported in U.S. patents to Hager, 2,477,597, issued August 2, 1949; Johnson et al., 2,477,617, issued August 2, 1949; Webb et al., 2,477,672, issued August 2, 1949; and Whitman, 2,477,674, issued August 2, 1949. A yield loss encountered in such processes is due to the conversion of cis-1,4-dichlorobutene to chloroprene.

It has long been known that 1,2-addition products of 1,3-butadiene, such as 3,4-dichlorobutene-1, tend to rearrange to the apparently more stable 1,4-addition products (Gillet, Bull, Soc. Chim. Belg. 31, 366 (1922); Muskat et al., J.A.C.S. 52, 4043 (1930); Muskat, U.S. Patent 2,038,593; Nicodemus et al., U.S. Patent 2,242,084; Otto, U.S. Patent 2,422,252). More particularly, in the Nicodemus et al. process metal halide condensing agents were used to carry out the rearrangement of 3,4-dichlorobutene-1 to 1,4-dichlorobutene-2 under anhydrous conditions at temperatures not exceeding 50° C. (following which the resulting mixture was reacted with water before separation of the desired isomer). On the other hand, in the Otto process temperatures exceeding 115° were used, i.e. temperatures above the boiling point of 3,4-dichlorobutene-1.

The present invention provides an improved process for converting 3,4-dichlorobutene-1 and cis-1,4-dichlorobutene-2 to trans-1,4-dichlorobutene-2, thus reducing the content of chloroprene precursor in the mixture. Accordingly, the present invention provides an improved isomerization method which makes possible the preparation of a mixture of dichlorobutenes which is advantageous as a source material for 1,4-dicyanobutene-2 and adiponitrile.

The dichlorobutenes which are employed in the practice of this invention are obtainable by chlorination of butadiene. The relative proportions of the various isomeric products depends on chlorination conditions, but in a typical case the three above-mentioned isomers, namely cis-1,4-dichlorobutene-2, trans-1,4-dichlorobutene-2, and 3,4-dichlorobutene-1, are each present in very substantial amounts. Each of the latter two components, when subjected to nitrilation conditions (e.g. aqueous acid containing cuprocyanide ion; NaCN added as fast as —C≡N replaces —Cl) gives rise to a yield of 1,4-dicyanobutene-2 (mixed isomers) which is about 20% higher than the corresponding yield of 1,4-dicyanobutene-2 from cis-1,4-dichlorobutene-2. The present invention effects an improvement in overall yield by providing a method for conversion of the dichlorobutene isomers which produces lower yields to the isomers which produce maximum yield, as a separate step in the overall process. It is to be understood that the isomerization product is generally not a single isomer, trans-1,4-dichlorobutene-2, but a mixture of isomers which is very rich in trans-1,4-dichlorobutene-2. The equilibrium mixture evidently contains about 5 to 6% cis-1,4-dichlorobutene-2, 15 to 20% 3,4-dichlorobutene-1, and 75 to 80% trans-1,4-dichlorobutene-2.

The isomerization of cis-1,4-dichlorobutene-2 and 3,4-dichlorobutene-1 to trans-1,4-dichlorobutene-2, in accordance with this invention is performed in the liquid phase, in the presence of aqueous hydrochloric acid containing a cuprous salt, such as cuprous chloride. The copper compound present in the mixture may be regarded as chlorocuprous acid. Temperatures in the range of 25° C. to 100° C. are suitable, and best results are obtained at a temperature within the range of 35° C. to 90° C. Ordinary pressures are generally employed, since pressure is not a critical variable. The process can be performed batchwise or continuously. Best results are attained by continuous operation, the flow of organic phase being either countercurrent to or cocurrent with the flow of aqueous phase. The relative proportions of the respective phases and the concentration of cuprous salt can be varied widely. However, for optimum results the concentration of hydrochloric acid employed in making the chlorocuprous acid catalyst solution is usually at least 10% by weight, suitably 35% to 40%. Preferably, the concentration of cuprous compound, expressed as CuCl, in the aqueous phase should be from 15% to 20% by weight. The volume ratio of aqueous phase to dichlorobutene phase, for optimum results, is from 2:1 to 5.5:1.

The isomerization should be performed in the absence of air since cupric chloride, which is formed when air is admitted, is relatively ineffective as a catalyst for the isomerization.

The reaction time or rate of throughput of dichlorobutene, may be varied. Under the optimum conditions described above the rate of isomerization is so rapid, even at a temperature as low as 25° C., that a reaction time of only about 10 to 30 minutes is sufficient to effect an 80+% approach to equilibrium concentration of the respective isomers present in the product. It is practicable, though not always desirable, to approach the equilibrium less closely. Thus, in a reaction vessel having a capacity of 2000 gallons the total effluent flow may be as high as about 200 gallons per minute. If desired, the isomerization can be performed in a series or battery of reaction vessels, and it is, of course, not necessary that all of these be operated at the same temperature.

The invention is illustrated further by means of the following examples.

EXAMPLE 1

A dichlorobutene feed containing 18% cis and 42% trans-1,4-dichlorobutene-2, with 39–40% 3,4-dichlorobutene-1, was introduced into a 400 cc. glass reaction vessel, equipped with a heater, stirrer, inlet means and outlet means; the vessel contained 200 cc. of nitrogen-blanketed catalyst mixture prepared by dissolving pure cuprous chloride in concentrated hydrochloric acid in proportions to produce 3HCl·1CuCl. All of the copper had been maintained in reduced form by agitating the catalyst solution over metallic copper in a sealed flask for 5 hours. The reaction vessel in runs d, e, and f (see table below) had an upper zone and a lower zone, separated by a perforated baffle and was operated continuously with the feed line dipping into the aqueous phase. One outlet was located at the base of the reactor, and from this the reaction mixture was continuously withdrawn and continuously recycled to the upper zone. Another outlet was positioned to provide a draw-off of dichlorobutene layer from above the baffle. In a series of runs (a, b, and *c* being batch experiments) the results obtained were as follows:

*Isomerization of cis-1,4-dichlorobutene to trans-1,4-dichlorobutene*

| Run | Temp., °C. | Mols Cu Per Mol Dichlorobutene | Time, Min. | Product, Percent | | |
|---|---|---|---|---|---|---|
| | | | | Cis | Trans | 3, 4 |
| a | 40 | 3.51 | 4 | 5 | 79 | 16 |
| b | 60 | 0.051 | 90 | 8 | 75 | 17 |
| c | 85 | 0.023 | 90 | 8 | 73 | 18 |
| d | 60 | 0.26 | 37 | 9 | 69 | 20 |
| e | 40 | 0.17 | 52 | 10 | 72 | 18 |
| f | 35 | 0.54 | 30 | 9 | 73 | 18 |

EXAMPLE 2

A dichlorobutene composition composed of the following isomers (percentage by weight)

| | Percent |
|---|---|
| Trans-1,4-dichlorobutene-2 | 42 |
| Cis-1,4-dichlorobutene-2 | 17 |
| 3,4-dichlorobutene-1 | 41 | is pumped into a glass lined vessel having a capacity of 2000 gallons, through an inlet at the base, as shown in the accompanying drawing. Catalyst solution (chlorocuprous acid made from concentrated hydrochloric acid (specific gravity 1.18) and cuprous chloride as hereinbelow disclosed) is similarly introduced. The apparatus used is shown in the illustrative drawing. This vessel 1 is equipped with a stirrer and with a water jacket for withdrawal of exothermic heat (reaction temperature, 35° C.). Effluent is withdrawn from the top of the the vessel 1 to the inlet of a similarly equipped vessel 2. Effluent from the top of vessel 2 is conducted to a decanter 3 from which an aqueous phase is withdrawn to a recycle catalyst tank 4, from which the aqueous mixture is returned to the reaction vessel 1, any necessary make-up cuprous chloride being supplied by copper metal introduced by means of a "catalyst reduction bed," i.e. a bed of copper metal packing 5. The recycle catalyst tank 4 is provided with an inlet through which concentrated hydrochloric acid and cuprous chloride can be introduced via a mixing tank 6. The decanter 3 is withdrawn to a storage vessel 7. The composition of the dichlorobutene in the effluent is as follows:

| | Percent |
|---|---|
| Trans-1,4-dichlorobutene-2 | 72 |
| Cis-1,4-dichlorobutene-2 | 8 |
| 3,4-dichlorobutene | 20 |

It is noteworthy that these figures when compared with the analysis of the starting material prove that 3,4-dichlorobutene-1 was converted to trans-1,4-dichlorobutene-2, i.e. the decrease in quantity of cis-1,4-dicyanobutene-2 was not sufficient to account for all of the increase in trans-1,4-dichlorobutene-2. The relative quantities of the materials employed, and the rates of flow were as specified below:

Rate of flow of dichlorobutene to vessel 1, 38.1 gallons per minute (specific gravity, 1.16).

Rate of flow of aqueous HCl+CuCl to vessel 1, 93 gallons per minute (specific gravity, 1.40).

Rate of withdrawing effluent from vessel 1, 131.1 gallons per minute.

Rate of withdrawing effluent from vessel 2, 131.1 gallons per minute.

As shown in the drawing, flexibility of operation can be facilitated by providing suitable piping arrangements for partially or completely by-passing or for operating with only one of the reaction vessels. The decanter 3, storage tank 7, recycle catalyst tank 4 and catalyst mix tank 6 should be suitably vented to the atmosphere.

It is, of course, to be understood that the illustrative examples hereinabove described do not limit the invention and that numerous other embodiments are possible. For example, 3,4-dichlorobutene-1 can be used in the absence of the other starting materials, but this is generally not the best or most economical method of practicing the invention. Of course, other dichlorobutene mixtures differing from the specifically illustrated mixture may be used. The copper may be introduced in any form which will be converted to cuprous chloride under the conditions employed. Agitation can be provided by vigorous stirring or by any other method for achieving good contact between the respective phases. The separation of phases can be facilitated by the use of a centrifuge instead of the decanter 3.

The present invention is especially useful as a step in the manufacture of 1,4-dicyanobutene-2, and is preferably integrated with a process for making the latter material in an aqueous acid mixture containing HCN and cuprous copper. The nitrilation reaction is preferably conducted at temperatures of 50° to 100° C. Exceptionally high yields of the desired 1,4-dicyanobutene-2 are thus obtainable (Example 7, of U.S. 2,477,672).

What is claimed is the following.

1. The process which comprises contacting a mixture of 3,4-dichlorobutene-1, cis-1,4-dichlorobutene-2, and trans-1,4-dichlorobutene-2, with aqueous chlorocuprous acid catalyst at a temperature from 25° C. to 100° C. and thereafter separating from the resulting mixture the organic phase comprising trans-1,4-dichlorobutene-2 formed from said 3,4-dichlorobutene-1 and from cis-1,4-dichlorobutene-2.

2. Process of claim 1 wherein the temperature of the mixture during the conversion of the reactants to trans-1,4-dichlorobutene-2 is 35 to 90° C.

3. Process of claim 2 wherein the volume ratio of aqueous phase to dichlorobutene phase is from 2:1 to 5.5:1.

4. Process of claim 3 wherein the quantity of cuprous compound in said aqueous catalyst, expressed as CuCl is 15% to 25% by weight.

References Cited in the file of this patent

UNITED STATES PATENTS

| 2,242,084 | Nicodemus et al. | May 13, 1941 |
| 2,446,475 | Hearne et al. | Aug. 3, 1948 |